(12) United States Patent
Reichert

(10) Patent No.: US 10,301,008 B1
(45) Date of Patent: May 28, 2019

(54) HINGED ROTOR BLADE TO PROVIDE PASSIVE VARIABLE PITCH

(71) Applicant: Kitty Hawk Corporation, Mountain View, CA (US)

(72) Inventor: Todd Reichert, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/589,858

(22) Filed: May 8, 2017

(51) Int. Cl.
*B64C 11/06* (2006.01)
*B64C 11/14* (2006.01)
*B64C 11/34* (2006.01)
*B64C 29/00* (2006.01)

(52) U.S. Cl.
CPC .............. *B64C 11/06* (2013.01); *B64C 11/14* (2013.01); *B64C 11/343* (2013.01); *B64C 29/0033* (2013.01)

(58) Field of Classification Search
CPC ....... B64C 11/06; B64C 11/14; B64C 11/343; B64C 29/00; F05D 2220/90
See application file for complete search history.

(56) References Cited

U.S. PATENT DOCUMENTS

| | | | | |
|---|---|---|---|---|
| 2,134,661 A * | 10/1938 | Everts | ................. | B64C 11/343 416/132 R |
| 2,192,492 A * | 3/1940 | Bennett | ................. | B64C 27/021 416/117 |
| 2,219,288 A * | 10/1940 | Avery | ................. | B64C 27/021 416/103 |
| 2,282,077 A * | 5/1942 | Moore | ................. | B64C 11/343 416/89 |
| 2,536,041 A * | 1/1951 | Dorand | ................. | B64C 11/343 416/141 |
| 5,054,716 A * | 10/1991 | Wilson | ................. | B64C 29/0033 244/56 |
| 7,147,182 B1 * | 12/2006 | Flanigan | ................. | B64C 29/0033 244/6 |
| 8,864,062 B2 * | 10/2014 | Karem | ................. | B64C 29/0033 244/12.4 |
| 9,156,545 B1 * | 10/2015 | Fenny | ................. | B64C 27/50 |

FOREIGN PATENT DOCUMENTS

SU          1541113 A1 *   2/1990

OTHER PUBLICATIONS

Bakshinov, English translation of "SU 1,541,113 Propeller for Transport Equipment", published Feb. 7, 1990.*
Paulos et al. "An Underactuated Propeller for Attitude Control in Micro Air Vehicles". IROS 2013.

* cited by examiner

Primary Examiner — Christopher Verdier
Assistant Examiner — Jason G Davis
(74) Attorney, Agent, or Firm — Van Pelt, Yi & James LLP

(57) ABSTRACT

A hinged propeller comprising a hub and one or more blades is disclosed. In various embodiments, a blade is connected to the hub via a hinge, wherein at least a substantial part of the blade has a longitudinal axis that is substantially parallel to a line extending radially from a center of the hub, and wherein the hinge has an axis of hinge rotation that is oriented at a non-zero acute angle to a line that is perpendicular, in a plane of rotation of the hub, to said longitudinal axis.

16 Claims, 4 Drawing Sheets

Pitch in hover

Pitch in forward flight

US 10,301,008 B1

HINGED ROTOR BLADE TO PROVIDE PASSIVE VARIABLE PITCH

BACKGROUND OF THE INVENTION

A variable pitch propeller is a propeller capable of being rotated about its longitudinal axis to vary the blade pitch. In aviation applications, a variable pitch propeller may be used to control the pitch of a propeller blade as it rotates, as in helicopter rotors, e.g., to control direction of flight, increase efficiency, and/or the amount of thrust (or lift) generated.

Typically, the pitch of a variable pitch propeller is controlled by a mechanical linkage and/or hydraulics. A control system typically is used to control the elements that vary the pitch. Such mechanisms may be complicated and may require frequent maintenance from highly skilled technicians. In addition, the mechanisms add weight, which results in higher fuel costs, or shorter battery life and therefore flight time in the case of an electric motor driven rotor, and which may make such propellers impractical for applications in which the additional weight is prohibitive.

BRIEF DESCRIPTION OF THE DRAWINGS

Various embodiments of the invention are disclosed in the following detailed description and the accompanying drawings.

DETAILED DESCRIPTION

Figure 1A:
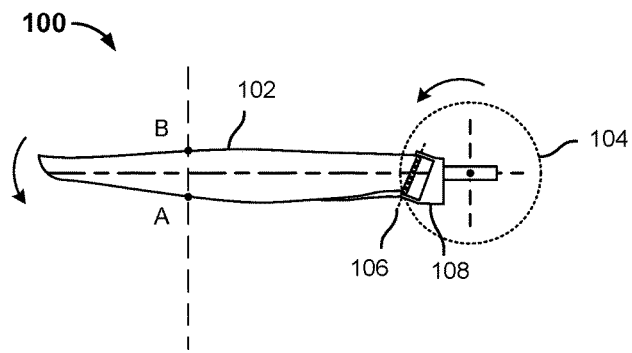
FIG. 1A is a diagram illustrating an embodiment of a rotor comprising a hinged blade to provide passive variable pitch.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A hinged rotor blade to provide passive variable pitch is disclosed. In various embodiments, a rotor includes one or more blades at least a substantial portion of which extend radially from a central hub or nose section of the rotor. The blade(s) is/are connected to the hub or nose section via a hinge mechanism, such as a pin hinge, oriented at an acute or other angle to a tangent to the hub or nose section. The orientation of the hinge pin or other axial member of the hinge mechanism results in the hinged blade rotating back and inward, when viewed from a vantage point in front of the leading edge of the blade, as the forces acting on the blade (e.g., thrust/lift, centrifugal force) change, e.g., as the propeller and/or aircraft transition from a substantially horizontal orientation (e.g., hover or vertical flight) to a substantially vertical orientation (e.g., forward flight). The above-described rotation of the blade results in the pitch of the blade changing as the orientation and/or forces acted on the blade change, thereby exhibiting variable pitch without requiring the mechanical and/or hydraulic mechanisms mentioned above.

FIG. 1A is a diagram illustrating an embodiment of a rotor comprising a hinged blade to provide passive variable pitch. In the example shown, propeller 100 includes a blade 102 coupled to a central hub 104 via a hinge connection 106, 108. In the example shown, the hinge includes a pin 106 that runs through a transverse hole in the end of blade 102 nearest hub 104 and through holes on tab portions of a blade mounted 108 attached fixedly to hub 104. The hinge 106, 108 in various embodiments enables blade 102 to fold back towards a central axis of hub 104, e.g., when no force is being applied to rotate propeller 100. Examples of hub 104 include without limitation nose cone or other aerodynamically shaped hubs commonly found on propellers.

Figure 1B:
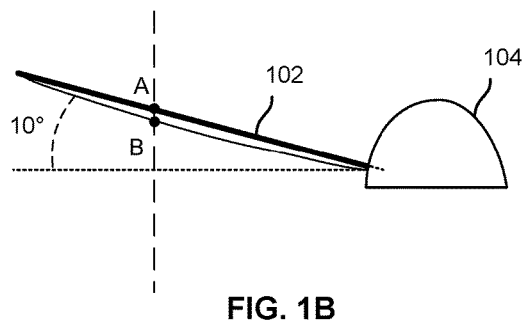
FIG. 1B shows the propeller 100 of FIG. 1 from a side view in a vertical flight (e.g., hover) mode of operation.
Figure 1D:
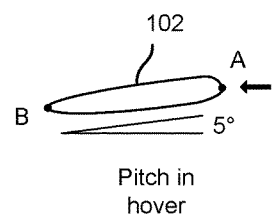
FIG. 1D shows the blade 102 of FIG. 1 from a side view in a vertical flight (e.g., hover) mode of operation.

FIG. 1B shows the propeller 100 of FIG. 1 from a side view in a vertical flight (e.g., hover) mode of operation. As shown in FIG. 1B, as the propeller 100 rotates in a substantially horizontal plane, a combination of centrifugal force and thrust/lift force causes the blade 102 to move outward from a central (z) axis of propeller 100 and to sweep upward from the horizontal plane, about 10 degrees up in the example shown. In some embodiments, an upper physical stop, such as an end of a notch in nosecone 104 that allows the blade 102 to sweep upward only to a point at which the blade 102 engages the stop, may prevent the blade 102 from sweeping up (as shown) beyond the point associated with the stop. FIG. 1D shows the blade 102 of FIG. 1 from a side view in a vertical flight (e.g., hover) mode of operation. In the deployed position shown in FIG. 1B, in hover/vertical flight blade 102 moves through the air at a relatively shallow pitch, e.g., about 5 degrees, as shown in the side cross-section view of blade 102 to the right of the middle drawing in FIG. 1B. In the example shown, in this first stable position and associated pitch, during hover/vertical flight the angle of attack of the blade 102 relative to oncoming airflow (represented by the black arrow to the far right of FIG. 1D) is as shown.

Figure 1C:
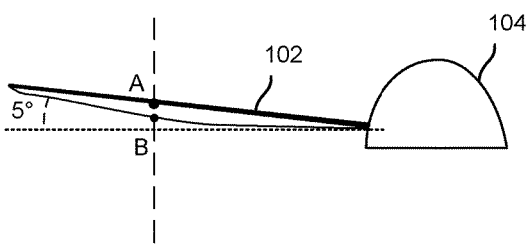
FIG. 1C shows the same propeller 100 and associated elements in a forward flight orientation and mode.
Figure 1E:
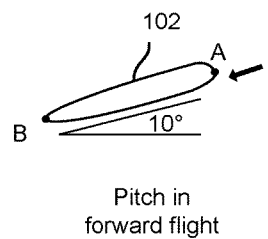
FIG. 1E shows the same blade 102 in a forward flight orientation and mode.

FIG. 1C shows the same propeller 100 and associated elements in a forward flight orientation and mode. In the example shown, the propeller 100 has been rotated to a forward flight position and mode in which the propeller 100 rotates in a substantially vertical plane and advances through the air in a forward direction associate with the tip and central (z) axis of nosecone 104. For example, the entire aircraft may have rotated (e.g., a tail sitter aircraft) or the propeller and/or a wing on which it is mounted may have been rotated (e.g., tilt rotor or tilt wing aircraft). In the forward flight mode, for the same rotational speed (e.g., RPM) the propeller 100 generates less thrust than at the same rotational speed in hover/vertical flight, while experience the same centrifugal forces. As a result, the dihedral angle of the blade 102 relative to the (substantially vertical) plane of rotation of the propeller 100 decreases, e.g., to 5 degrees in the example shown. FIG. 1E shows the same blade 102 in a forward flight orientation and mode. At this relatively lower dihedral angle, as shown in FIG. 1C, given the orientation of the hinge joint (106, 108) the blade 102 rotates back about its longitudinal axis and as a result its pitch increases passively, e.g., to 10 degrees in the example shown in FIG. 1E. The result is a lower angle of attack with respect to net oncoming airflow (black arrow a far right of FIG. 1E, the airflow comprising the resultant flow associated with the propeller turning—horizontal component as shown—and the entire aircraft moving forward downward vertical component as shown), relative to the hover mode and orientation, which enables the propeller to generate the (relatively lower) thrust required for forward flight without stalling.

Referring further to FIG. 1A, in the example shown, the axis of rotation of the hinge 106, 108 is offset from a line perpendicular to a longitudinal axis of the blade 102 by an acute angle (i.e., >0 degrees but <90 degrees). As a result of this offset, blade 102 when viewed from a point in front of a leading edge of blade 102 (associated with point "A" in the example shown), rotates back around its longitudinal axis as the dihedral angle (relative to the plane of rotation of the propeller 100) decreases, resulting in pitch varying passively as the dihedral angle is changed, such as by changing from a hover/vertical flight orientation and mode to a forward flight orientation and mode (transition from FIG. 1B to 1C) or vice versa.

Figure 2A:
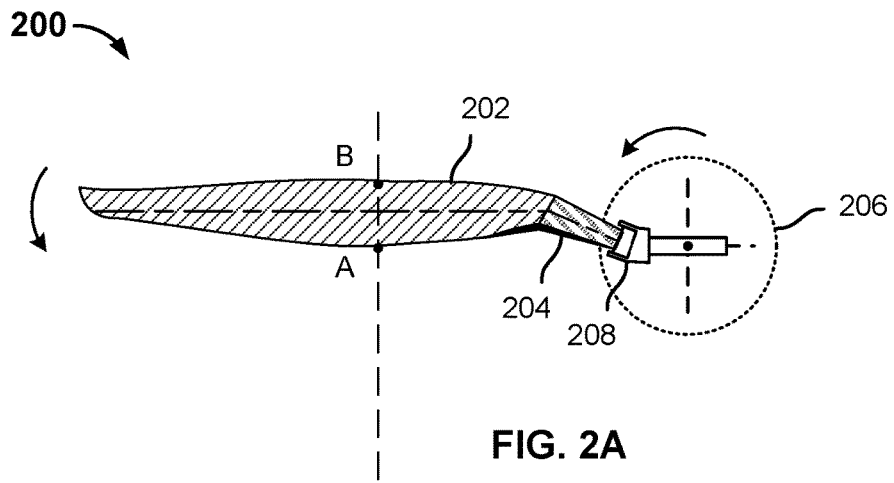
FIG. 2A is a diagram illustrating an embodiment of a rotor comprising a hinged blade to provide variable pitch.

FIG. 2A is a diagram illustrating an embodiment of a rotor comprising a hinged blade to provide variable pitch. In the example shown in FIG. 2, propeller 200 includes a blade 202, 204 that has a primary airfoil portion 202 that extends radially from a central hub 206. In various embodiments, a longitudinal axis of primary airfoil portion 202 may be coincident with or run parallel to a line extending radially from a center of hub 206. The primary airfoil portion 202 is coupled to the hub 206 via an angled neck portion 204 coupled to the hub 206 via a hinge 208. In this example, the hinge 208 has a rotational axis (e.g., a pin or other axel) that is offset by an acute angle, in the x-y plane (i.e., the plane of the page as shown in the top drawing in FIG. 2), from a line perpendicular to the longitudinal axis of primary airfoil portion 202.

Figure 2B:
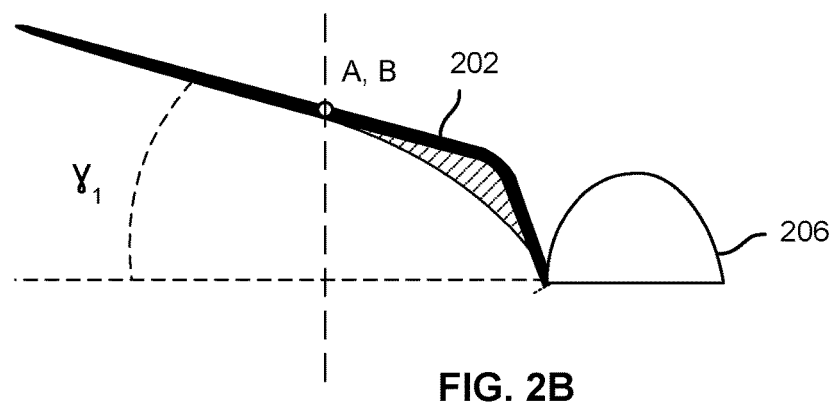
FIG. 2B shows a side view the propeller 200 of FIG. 2A in a hover/vertical flight orientation and mode.

FIG. 2B shows a side view the propeller 200 of FIG. 2A in a hover/vertical flight orientation and mode. As shown in FIG. 2B, in hover/vertical flight the blade 202 of propeller 200 is at a relatively higher dihedral angle γ (gamma) and presents a relatively shallow pitch.

Figure 2C:
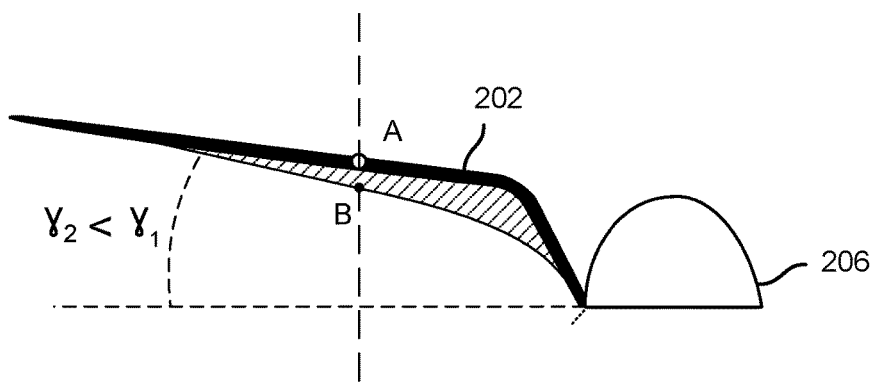
FIG. 2C shows the propeller 200 in a forward flight orientation and mode.

FIG. 2C shows the propeller 200 in a forward flight orientation and mode. In forward flight, the blade 202 rotates back and inward (compare FIG. 2B with FIG. 2C), similarly to the example shown in FIGS. 1A-1C, passively varying the pitch of the blade, as illustrated in this example by the change in position of point B relative to point A, and the increased amount of the bottom side of the propeller blade (cross hatched areas in middle and bottom drawings) visible as the blade folds back on its hinge 208.

As illustrated in FIG. 2A, in the example shown, the neck portion 204 suspends the primary airfoil portion 202 at a distance from the hinge 208, the distance being determined by a length of the next portion 204, in a direction orthogonal to the rotational axis of the hinge 208. In various embodiments, the length and shape of the neck portion 204 may be selected to achieve a desired degree of change in the pitch (angle of attack) of the primary airfoil portion 202 associated with a corresponding amount of rotation about the axis of rotation of the hinge 208.

In various embodiments, techniques disclosed herein may be used to vary passively the overall pitch of a propeller comprising a twisted blade, the fixed pitch of which is different at different points along the length of the blade. In some embodiments, blade twist may be taken into consideration in determining the effect of varying the overall pitch of a blade passively as disclosed herein.

In various embodiments, propellers comprising blades that are hinged as disclosed herein, i.e., at an offset from a line perpendicular to a longitudinal axis of at least a primary airfoil portion of the blade, may be used to provide passively varied pitch in the context of vertical/short takeoff and landing aircraft, including without limitation tilt rotor, tilt wing, and tail-sitter type aircraft. Such aircraft may use one or more propellers/rotors to provide lift in a vertical or hover mode of flight, and may use the same one or more propellers/rotors to provide thrust in a forward flight mode. In the vertical/hover mode, the rotors may be used to generate the relatively high amount of lift force that may be needed to take off or land vertically and/or maintain the aircraft in a hover. In the hover/vertical flight orientation and mode of operation, the blades of a propeller as disclosed herein in various embodiments experience a resultant force that causes them to be deployed to a dihedral angle at which they are oriented at a relatively lower pitch (than in forward flight, for example), which may be optimal to provide lift in the vertical flight or hover mode. By contrast, in the forward flight mode, in various embodiments the propeller blades may shift passively to a position at a lower dihedral angle, at which the blade pitch is higher than in the hover/vertical flight mode, to generate thrust to sustain forward flight and translate the aircraft to a desired destination. In some embodiments, the thrust required for forward may be on the order of one tenth that required for vertical flight/hover.

In various embodiments, the shape and materials of the blades and the angle at which the hinge is oriented are selected such that in forward flight the blades rotate back about their longitudinal axes to a position in which their respective pitch changes passively to a higher pitch (than in hover/vertical flight).

Figure 3:
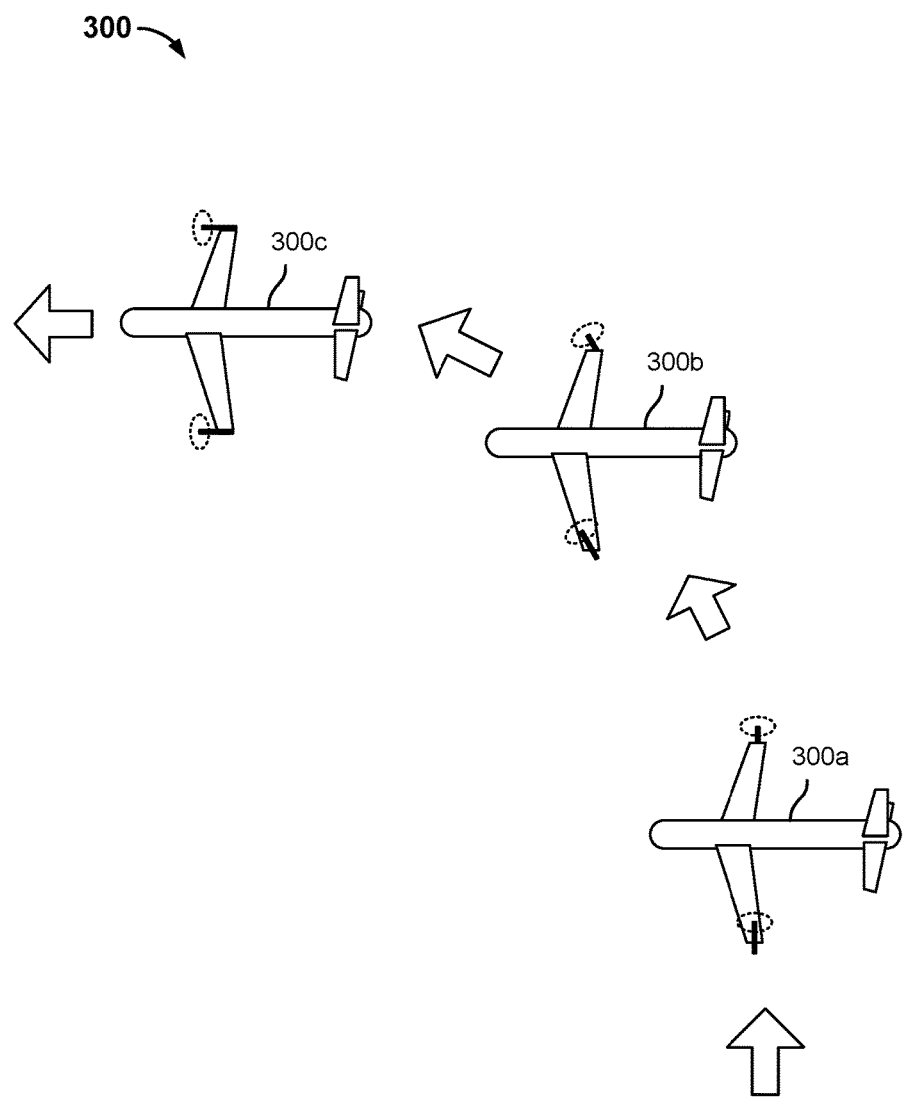
FIG. 3 is a diagram illustrating an embodiment of a tilt rotor aircraft in which a rotor comprising a hinged blade to provide variable pitch may be used.

FIG. 3 is a diagram illustrating an embodiment of a tilt rotor aircraft in which a rotor comprising a hinged blade to provide variable pitch may be used. In the example shown, a tilt rotor aircraft 300 is shown in three stages of flight. In a first stage the aircraft 300a is shown taking off in a vertical flight mode. In a next stage, the aircraft 300b is shown transitioning from the vertical flight mode (300a) to a forward flight mode (300c).

In the example shown, the rotors on the wing tips of the aircraft 300 are shown to rotate from a vertical position (300a) to an intermediate position (300b) as the aircraft transitions to forward flight, and finally to a horizontal position (300c) as the aircraft flies in forward flight. In a tilt wing aircraft, the rotors may remain in a fixed position on the wings, and the wings may transition through vertical and intermediate positions during takeoff and ultimately to a horizontal position for forward flight. In a tail sitter type aircraft, the entire aircraft, excepting in some embodiments a cockpit portion, may rotate from a vertical to a transitional and finally to a forward flight orientation, with both the wings and rotors remaining in a fixed position relative to the airframe. In all three types of aircraft, significantly more thrust may be required to be generated during takeoff, hover, and/or landing, as applicable, than during forward flight. In some embodiments, up to ten times the thrust/lift may need to be generated in vertical flight and/or hover.

In various embodiments, passively variable pitch propellers as disclosed herein may be used in aircraft such as the tilt rotor aircraft shown in FIG. 3 and/or tilt wing or tail sitter type aircraft described above. In the vertical flight mode, as during takeoff as shown in FIG. 3, the rotors generate the thrust required for vertical flight, and in such an orientation and mode the resultant (net) force on the blades may be sufficient to deploy the blades fully to a first stable position having a first pitch. In forward flight, the rotors may fold back (lower but still positive dihedral angle, for example) to a second stable position having a second pitch more optimal for forward flight.

In some embodiments, a propeller blade may be hinged at an angle such that the leading edge is nearer a center/central rotational axis of the hub/nosecone than the trailing edge. In such embodiments, a position of the blade at a higher dihedral angle would have a higher pitch than at a lower dihedral angle, i.e., opposite of the examples shown in FIGS. 1A-2C.

Figure 4:
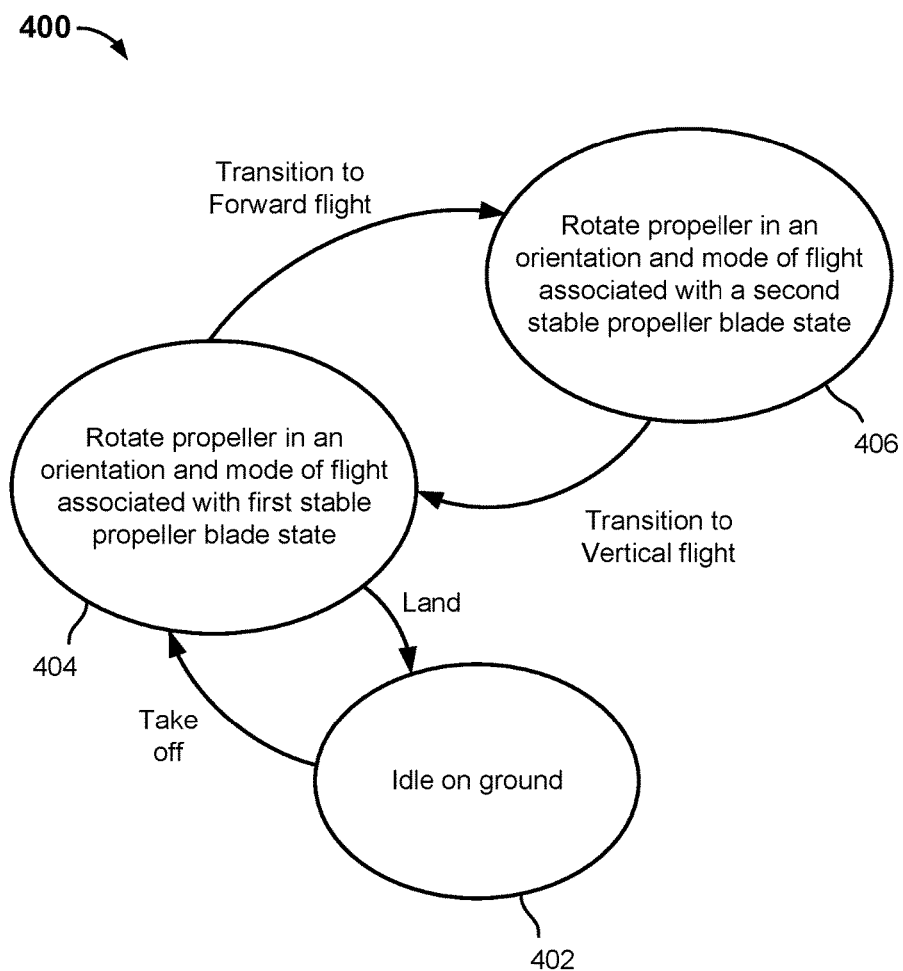
FIG. 4 is a state diagram illustrating an embodiment of a flight control system such as may be used in an embodiment of an aircraft having a rotor comprising a hinged blade to provide variable pitch.

FIG. 4 is a state diagram illustrating an embodiment of a flight control system such as may be used in an embodiment of an aircraft having a rotor comprising a hinged blade to provide variable pitch. In some embodiments, a flight control system may implement the state diagram 400 of FIG. 4. In some embodiments, a flight control system of a vertical takeoff and landing aircraft, such as the tilt rotor aircraft of FIG. 3, may implement the state diagram of FIG. 4. In the example shown, a flight control system and/or aircraft implementing the state diagram of FIG. 4 is in a non-flight state 402, e.g., is landed on the ground with the rotors not rotating or rotating at an idle speed. The aircraft may transition via take off to a first stable propeller state 404, in which to propeller is in a substantially horizontal orientation associated with vertical flight (e.g., takeoff, hover, landing). As a result, in the first stable propeller state 404 the blades may be (more) fully deployed to a position associated with a first pitch. The aircraft may transition to a forward flight mode in which the propeller blades may be in a second stable state 406 associated with forward flight, and may rotate passively to a second stable position having a second pitch that is higher than the first pitch associated with the first stable position.

The reverse sequence of states and transitions may be exhibited as the aircraft transitions from the forward flight mode/state (406) to the vertical flight mode/state (404), e.g., to prepare for landing, and from the vertical flight mode/state to the landed and/or idling state (402) as the aircraft lands. In the latter state, the propeller blades may fold back further or fully (if shutdown) on their hinges.

Techniques disclosed herein may be used to provide a variable pitch propeller without requiring complicated and/or heavy mechanisms to drive the blades to the desired pitch. In various embodiments, pitch may be varied by varying the speed of rotation of the propeller.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A propeller for an aircraft, comprising:
a hub;
a blade connected to the hub via a hinge having a single pivotal link, wherein the blade has a longitudinal axis extending through a center of the blade and running from a root of the blade to a tip of the blade, and wherein the hinge has an axis of hinge rotation that is oriented at a non-zero angle to a tangent line tangent to the hub, the tangent line intersecting said longitudinal axis; and
a neck portion coupling the blade and the hub, wherein the neck portion is angled away from a plane of rotation of the hub to vary pitch of the blade as the hinge rotates about the axis of hinge rotation;
wherein:
the aircraft is configured to transition between a forward flight mode and a vertical flight mode,
for a same rotational speed, the propeller passively decreases pitch in the vertical flight mode relative to the forward flight mode at the same rotational speed,
in the forward flight mode, the hinge responds to a first combination of centrifugal force and thrust force by causing the blade to move outward from a central axis of the hub to sweep outward from the plane of rotation of the hub to a first threshold point, and
in the vertical flight mode, the hinge responds to a second combination of centrifugal force and thrust force by causing the blade to move outward from the central axis of the hub to sweep upward from the plane of rotation of the hub to a second threshold point, the second threshold point being farther from the plane of rotation of the hub than the first threshold point.

2. The propeller of claim 1, wherein said hinge comprises a pin positioned on said axis of hinge rotation.

3. The propeller of claim 1, wherein said hinge is integrated with a structure mounted fixedly to said hub.

4. The propeller of claim 1, wherein said hub comprises a nose cone.

5. The propeller of claim 1, wherein the hinge is oriented in a plane that is in the plane of rotation of the hub.

6. The propeller of claim 1, wherein the hinge comprises a forward end associated with a leading edge of the blade and a rearward end associated with a trailing edge of the blade, and wherein the forward end lies further from a geometric center of the hub than the rearward end.

7. The propeller of claim 1, wherein the neck portion has a neck portion longitudinal axis that is substantially orthogonal to the axis of hinge rotation and a substantial part of the blade is coupled to the hub by said neck portion.

8. The propeller of claim 1, wherein a substantial part of the blade comprises a primary airfoil portion of the blade.

9. The propeller of claim 1, wherein in a first propeller orientation associated with a first mode of flight the blade deploys to a first stable position associated with a first pitch, and in a second propeller orientation associated with a second mode of flight the blade rotates about the axis of hinge rotation to a second stable position associated with a second pitch.

10. The propeller of claim 9, wherein the first propeller orientation comprises a substantially horizontal plane of rotation.

11. The propeller of claim 10, wherein the second propeller orientation comprises a substantially vertical plane of rotation.

12. The propeller of claim 1, the blade comprises an airfoil portion, wherein the neck portion is positioned between the airfoil portion and the hinge.

13. The propeller of claim 12, wherein the neck portion is structured to cause a change in pitch of the airfoil portion associated with a corresponding amount of rotation about the axis of rotation of the hinge.

14. The propeller of claim 1, wherein said hub comprises an aerodynamically shaped structure.

15. The propeller of claim 1, wherein the hub includes an upper physical stop limiting an extent to which the blade is able to sweep upward.

16. The propeller of claim 1, wherein the hub includes an upper physical stop limiting an extent to which the blade is able to sweep upward to no greater than 10 degrees relative to the longitudinal axis.

* * * * *